United States Patent
Gärtner et al.

(10) Patent No.: US 10,255,804 B2
(45) Date of Patent: Apr. 9, 2019

(54) METHOD FOR GENERATING A DIGITAL RECORD AND ROADSIDE UNIT OF A ROAD TOLL SYSTEM IMPLEMENTING THE METHOD

(71) Applicant: Kapsch TrafficCom AG, Vienna (AT)

(72) Inventors: Andreas Gärtner, Vienna (AT); Oliver Nagy, Vienna (AT); Christian Öhreneder, Pressbaum (AT)

(73) Assignee: Kapsch TrafficCom AG, Vienna (AT)

( * ) Notice: Subject to any disclaimer, the term of this patent is extended or adjusted under 35 U.S.C. 154(b) by 1 day.

(21) Appl. No.: 15/559,766

(22) PCT Filed: Jan. 27, 2016

(86) PCT No.: PCT/EP2016/051692
§ 371 (c)(1),
(2) Date: Sep. 19, 2017

(87) PCT Pub. No.: WO2016/150593
PCT Pub. Date: Sep. 29, 2016

(65) Prior Publication Data
US 2018/0158327 A1  Jun. 7, 2018

(30) Foreign Application Priority Data
Mar. 20, 2015 (EP) .................................. 15160046

(51) Int. Cl.
*G06K 9/00* (2006.01)
*G08G 1/04* (2006.01)
(Continued)

(52) U.S. Cl.
CPC .......... *G08G 1/04* (2013.01); *G06K 9/00201* (2013.01); *G06K 9/3233* (2013.01); *G07B 15/06* (2013.01); *G06K 2209/15* (2013.01)

(58) Field of Classification Search
None
See application file for complete search history.

(56) References Cited

U.S. PATENT DOCUMENTS 6,487,311 B1   11/2002  Gal et al.
2007/0189615 A1   8/2007  Liu et al.
(Continued)

FOREIGN PATENT DOCUMENTS

EP   2779138 A1   9/2014
EP   2790157 A1   10/2014
(Continued)

OTHER PUBLICATIONS

Extended European Search Report received for European Patent Application No. 15160046.7, dated Sep. 9, 2015, 11 pages.
(Continued)

*Primary Examiner* — Delomia L Gilliard
(74) *Attorney, Agent, or Firm* — Fiala & Weaver P.L.L.C.

(57) ABSTRACT

The present subject matter relates to a method and a roadside unit for generating a digital record of a vehicle in a road toll system, comprising: capturing an image of the vehicle on a roadway; data-compressing the image depending on at least one of a confidence level obtained from the image for one or more characters therein by means of OCR, and a contrast parameter obtained from the image or a region of interest therein or a section of the latter, to generate the digital record; and sending the digital record from the roadside unit to a data center of the road toll system.

20 Claims, 5 Drawing Sheets

(51) Int. Cl.
G07B 15/06 (2011.01)
G06K 9/32 (2006.01)

(56) References Cited

U.S. PATENT DOCUMENTS

| | | |
|---|---|---|
| 2011/0064320 A1 | 3/2011 | Ikuno |
| 2012/0148105 A1* | 6/2012 | Burry .................. G06K 9/033 382/105 |
| 2015/0049914 A1* | 2/2015 | Alves .................. G06K 9/033 382/105 |
| 2016/0148076 A1* | 5/2016 | Kozitsky ............... G06K 9/627 382/159 |

FOREIGN PATENT DOCUMENTS

| | | |
|---|---|---|
| JP | 10-191374 A | 7/1998 |
| WO | 2016/150593 A1 | 9/2016 |

OTHER PUBLICATIONS

International Preliminary Report on Patentability received for PCT Patent Application No. PCT/EP2016/051692, dated Feb. 23, 2017, 18 Pages.
International Search Report and Written Opinion received for PCT Patent Application No. PCT/EP2016/051692, dated Apr. 8, 2016, 14 Pages.

* cited by examiner

METHOD FOR GENERATING A DIGITAL RECORD AND ROADSIDE UNIT OF A ROAD TOLL SYSTEM IMPLEMENTING THE METHOD

CROSS-REFERENCE TO RELATED APPLICATION(S)

This application is a U.S. national phase application of PCT/EP2016/051692, filed on Jan. 27, 2016, which claims priority to European Patent Application No. 15 160 046.7 filed on Mar. 20, 2015, which are both incorporated by reference herein in their entireties.

BACKGROUND

Technical Field

The present subject matter relates to a method for generating a digital record for a vehicle in a road toll system. The present subject matter further relates to a roadside unit (RSU) for use with said method.

Background Art

For collecting toll in an electronic road toll system, for monitoring the compliance and/or for enforcing road toll rules and traffic laws, it is common to deploy roadside gantries with cameras mounted thereon which capture images of all or non-compliant passing vehicles. A vehicle can then be identified in the image, e.g. by reading its license plate number by means of optical character recognition ("OCR") and/or potential other marks or signs thereon, like inscriptions, country of origin labels, dangerous goods safety marks etc. For subsequent processing and evidence, the image is transmitted to a data center of the road toll system which is typically centrally located and implemented in redundancy.

When the OCR engine is located in a roadside unit, it is generally limited in terms of its computational power due to both costs and environmental restrictions, e.g. the maximum allowable power consumption and/or operating temperature etc. However, a single centralized second OCR engine can run highly sophisticated algorithms on high performance computing systems at considerably lower overall costs as compared to a multiplicity of high performance roadside units. Thus, in some electronic road toll systems roadside OCR procedures are assisted by a second stage OCR process in the data center in order to increase the overall OCR capture rate.

The cameras of a typical electronic road toll system generate images or evidences (i.e. "records") in large quantities, particularly in a purely video-based road toll system. In the data center, the records transmitted thereto and processed therein also have to be stored for a statutory data retention period resulting in a very high accumulated data volume (e.g. one terabyte per day, i.e. accumulated up to one petabyte within a two years period). Data availability requirements cause increasing expenditures for storing such "big" data.

With a new generation of cameras being increasingly deployed and their at least fourfold resolution as compared to present models, the need of costly bandwidth and storage rises substantially. On the other hand, the higher resolution and better quality of new cameras provide a significant increase in the quality of evidence and in the accuracy of identification.

BRIEF SUMMARY

It is an object of the disclosed subject matter to provide a method for generating a digital record which decreases the data volume without compromising the quality and accuracy for both toll collection and enforcement.

According to a first aspect of the disclosed subject matter, this object is achieved with a method of the type mentioned at the outset, comprising, in a roadside unit of the road toll system:

capturing an image of the vehicle on a roadway by means of a camera of the roadside unit;

data-compressing the image depending on at least one of a confidence level obtained from the image for one or more characters therein by means of OCR, and a contrast parameter obtained from the image or a region of interest therein or a section of the latter, to generate the digital record; and sending the digital record from the roadside unit to a data center of the road toll system.

The digital record generated by this method benefits from a high-quality high-resolution camera without requiring excessive transmission bandwidth or storage capacity. As the data-compression depends on the confidence level obtained by optical character recognition (OCR) and/or the contrast parameter, it is dynamically derived from the situation in the image. The contrast parameter is based on the difference in luminance and/or colour of objects or regions in the image; it can easily be generated by the roadside unit, e.g. from a luminance histogram of the image, the region of interest or the section using different quantiles of the histogram, and constitutes another valuable indication of the readability of the characters.

The image can be data-compressed depending on an average or a sum or product of one or more confidence levels obtained. In a variant, the image is data-compressed depending on the smallest of one or more confidence levels obtained by means of OCR. When generated, the digital record is thereby attuned to the lowest quality result of the OCR.

In an embodiment in the step of data-compressing, the whole image is data-compressed at one and the same compression ratio. This way, the data-compression can be executed quickly and efficiently.

An alternative embodiment is distinguished by:

between said steps of capturing and data-compressing, finding, in the image, at least one region of interest containing said one or more characters and obtaining said one or more characters from said region of interest by means of OCR together with a confidence level of the OCR for each character, defining one or more sections in said region of interest, each section containing a character, and calculating the first compression ratio for each section depending at least on the confidence level of the character contained therein;

in said step of data-compressing, data-compressing the one or more sections, each at its first compression ratio, to obtain one or more compressed sections, and data-compressing at least the remainder of the image at a predetermined second compression ratio to obtain a compressed image, wherein each first compression ratio is lower than said second compression ratio; and in said step of sending, sending the compressed image together with the one or more compressed sections as the digital record from the roadside unit to a data center of the road toll system.

Thereby, regions of lower significance in the image are compressed at a higher degree while segments in the region(s) of interest, which for example include(s) a license plate, are transmitted and stored at a lower compression ratio. As the first compression ratio depends on the confidence level of the respective character, it is dynamically derived from the particular situation in the captured image or its region of interest. Thus, obstructions in the line-of-sight, e.g. due to unfavourable lighting or weather conditions, as well as any other obstruction, e.g. due to soiled or stained characters in the region of interest, are accounted for in the calculation of the first compression ratio even down to the level of a single character.

In the digital record, the one or more compressed sections and the compressed image can be separate from each other; the compressed image and the one or more compressed sections may be merged in the digital record, making the digital record more compact and easier to handle.

For generating a more uniform digital record, it is advantageous when the first compression ratio for at least one of the sections is determined also depending on at least the confidence level of a character contained in another section, such as depending on the confidence levels of all characters in the region of interest. By such attunement of several or even all confidence levels of the characters in the region of interest the step of data-compressing can be accelerated by achieving a single uniform or at least few similar first compression ratios for several or all sections or even the whole region of interest during the step of calculating.

The region of interest can cover e.g. a license plate of the vehicle, a country of origin label, dangerous goods safety marks or similar. In an embodiment, the region of interest covers, in the image, a license plate of the vehicle and an area which is separate from the license plate and contains one or more characters. Thus, all characters and confidence levels in the region of interest can be obtained and allocated thereto. Advantageously, the first compression ratio for at least one of the sections of the license plate is determined also depending on at least the confidence level of a character contained in said other area, in this case. In this way, a significant character, mark, sign, or inscription in the region of interest is used to calculate the first compression ratio of the one or more, or even all sections in the region of interest.

Additionally or alternatively thereto, the first compression ratio for each section may be determined also depending on a contrast parameter of the image, of the region of interest, or of the respective section thereof. The contrast parameter can easily be included in the calculation of the first compression ratio. Thereby, the benefits of additionally considering the contrast parameter can also be taken down to the level of each single character.

In a variant, during the step of data-compressing, the complete image is data-compressed to obtain the compressed image. In doing so instead of data-compressing only the remainder of the image, a precise identification of said remainder is not necessary; the one or more compressed sections can either be separately adhered to the compressed image or be merged therewith.

In an embodiment, the digital record further comprises the characters obtained by OCR. In this case, the data center can completely dispose of another OCR operation; alternatively, such other OCR operation can be executed in the data center immediately after reception or at a later stage, e.g. only if required, in order to double-check the OCR results of the roadside unit, thereby further increasing the accuracy of OCR and vehicle identification.

For further increasing the accuracy, the digital record may comprise the confidence level of at least one character. In addition or alternatively thereto, the digital record may further comprise the first compression ratio for each section. Such information can be used as additional indication of the quality and accuracy of the digital record.

According to a second aspect, the disclosed subject matter creates a roadside unit for generating said digital record, comprising:

a roadside camera for capturing an image of the vehicle on a roadway;

a data-compression unit configured to data-compress the image depending on at least one of a confidence level obtained from the image for one or more characters therein by means of OCR, and a contrast parameter obtained from the image or a region of interest therein or a section of the latter, to generate the digital record; and a transmitter connected to the data-compression unit and configured to send the digital record from the roadside unit to a data center of the road toll system.

In a variant thereof, the roadside unit further comprises:

a selecting unit connected to the camera and configured to find, in the image, at least one region of interest containing one or more characters;

an OCR unit connected to the selecting unit and configured to obtain the one or more characters from the region of interest by means of OCR together with a confidence level of the OCR for each character;

a calculation unit connected to the OCR unit and configured to calculate a first compression ratio for each of one or more sections in said region of interest depending at least on the confidence level of the character contained in the respective section;

the data-compression unit being connected to the calculation unit, the selecting unit and the camera and configured to data-compress the one or more sections, each at its first compression ratio, to obtain one or more compressed sections, and to data-compress at least the remainder of the image at a predetermined second compression ratio to obtain a compressed image, wherein each first compression ratio is lower than said second compression ratio; and the transmitter being configured to send, as the digital record, the compressed image together with the one or more compressed sections to the data center of the road toll system.

Relating to advantages and further particular embodiments of the roadside unit, it is referred to the above statements on the method of the disclosed subject matter.

BRIEF DESCRIPTION OF THE DRAWINGS/FIGURES

The disclosed subject matter will now be described in further detail by means of exemplary embodiments thereof under reference to the enclosed drawings in which.

DETAILED DESCRIPTION

Figure 1:
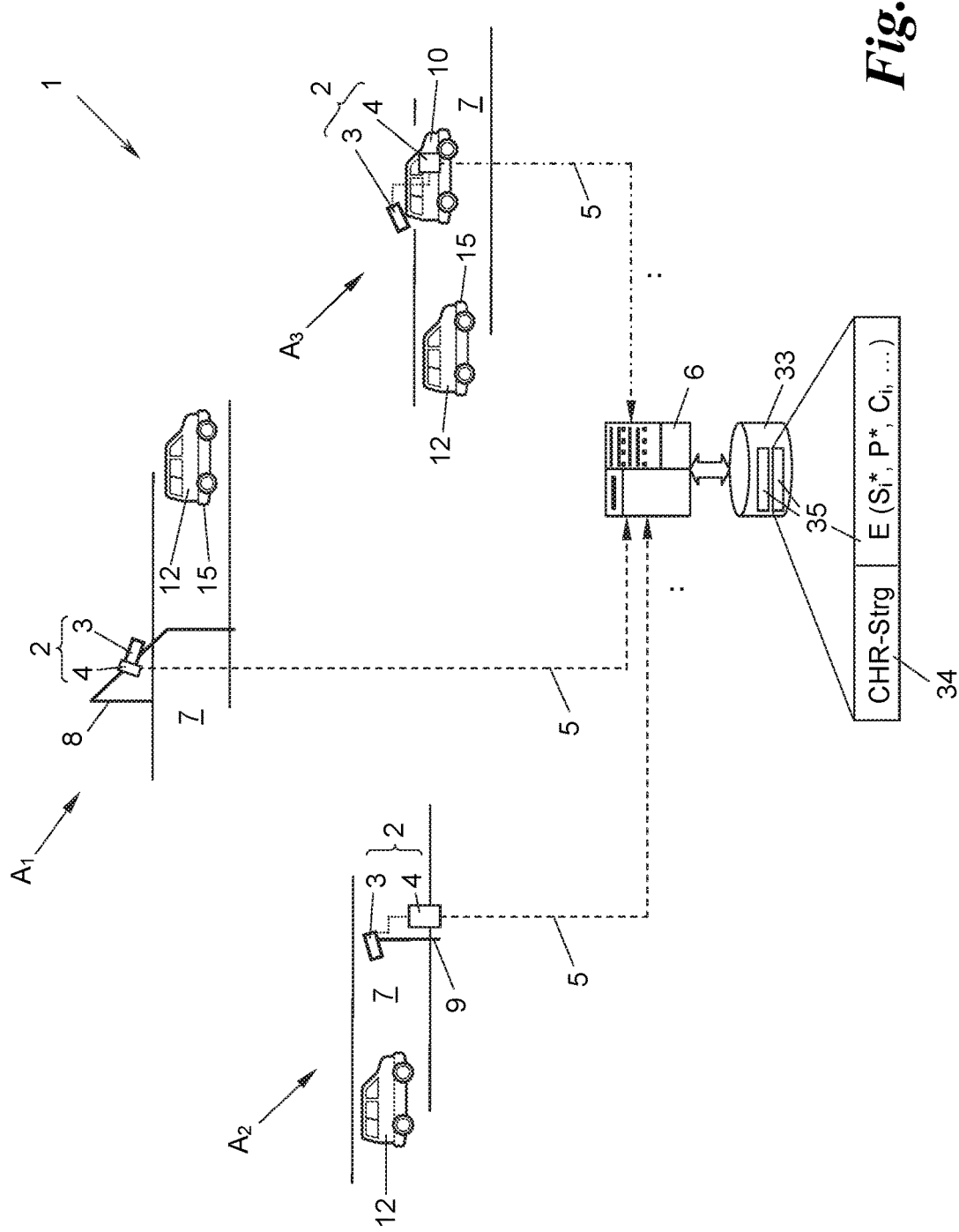
FIG. 1 shows a road toll system with roadside units according to the disclosed subject matter in a schematic perspective view.

According to FIG. 1, a road toll system 1 is equipped with roadside units 2 at different road segments $A_1$, $A_2$, ..., generally $A_i$, some or even all of which could be car parks or similar (not shown). Each roadside unit 2 has a camera 3 and a control module 4 and is configured to transmit information via wired or wireless connections 5 to a central data center 6 of the road toll system 1.

As shown in FIG. 1, the camera 3 of each roadside unit 2 is directed at a roadway 7 in the respective road segment $A_i$. For this purpose, the camera 3 is mounted on a bridge or gantry 8 crossing the roadway 7 (road segment $A_1$), to a roadside pole 9 (road segment $A_2$), or in a control car 10 (road segment $A_3$) or moveable rack (not shown), whereby the roadside unit 2 becomes mobile or portable. In any case, camera 3 and control module 4 can be formed as an integrated roadside unit 2, as shown in road segment $A_1$, or, alternatively, distributed over two or more enclosures communicating with each other, as shown for road segment $A_2$ in FIG. 1.

Figure 2:
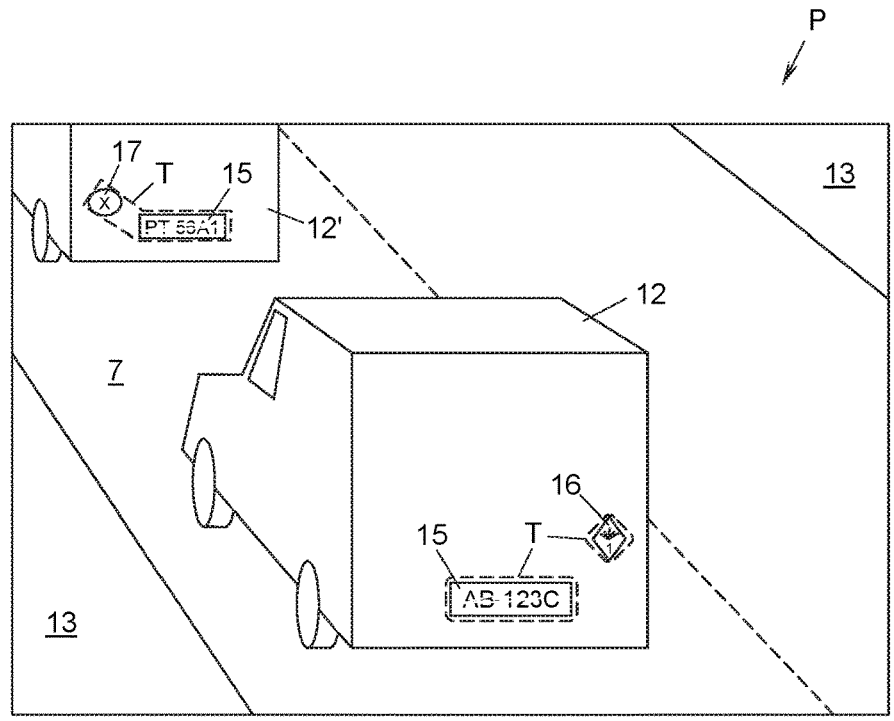
FIG. 2 shows an exemplary image captured by one of the roadside units of FIG. 1 and depicting a vehicle.
Figure 3:
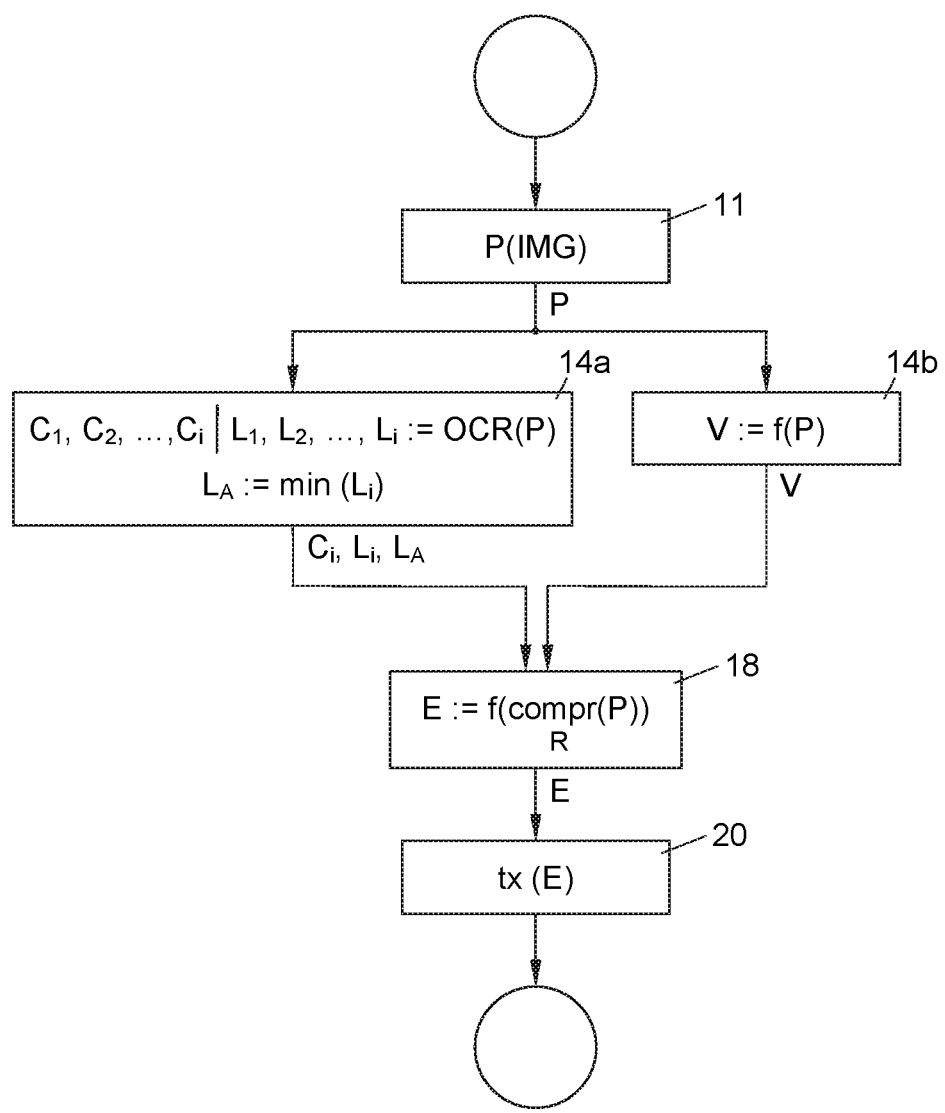
FIG. 3 shows a general embodiment of the method of the disclosed subject matter in a flow chart.

With reference to FIGS. 2 and 3, a general embodiment of the method for generating a digital record E for the data center 6 in any one of the roadside units 2 of the road toll system 2 shall now be described.

In a first step 11 according to FIG. 3, the camera 3 of a roadside unit 2 captures an image P of a vehicle 12 passing the roadside unit 2 on the roadway 7. An exemplary such image P according to FIG. 2 shows a portion of the roadway 7 and the vehicle 12 thereon; depending on the traffic and the viewing angle, other vehicles 12', a shoulder 13 of the roadway 7 etc. can also be visible in the image P (FIG. 2). The camera 3 can either capture a front view of the vehicle 12 (as in road segments $A_2$ and $A_3$ in FIG. 1) or a back view of the vehicle (as in road segment $A_1$ in FIG. 1 and in FIG. 2).

In a next step 14a, information on one of the vehicles 12, 12' in the form of one or more readable characters $C_1$, $C_2$, ..., generally $C_i$, is obtained from the image P by means of optical character recognition (OCR) as known in the art, e.g. from a license plate 15, a dangerous goods safety mark 16 or a country of origin label 17 on the vehicle 12, 12' as per the example of FIG. 2, together with a confidence level $L_1$, $L_2$, ..., generally $L_i$, of the one or more characters $C_i$ in the image P. The one or more characters $C_i$ can be letters, numerals or other graphical symbols or visual features of significance for identification and/or enforcement, which can be recognized by OCR, including, e.g., a shape or type of the license plate 15, the safety mark 16 or the label 17. It is possible to obtain a single confidence level $L_i$ for the one or more characters $C_i$ or a separate confidence level $L_i$ for each character $C_i$. From the one or more confidence levels $L_i$, a minimum value can optionally be determined according to any algorithm known in the art, resulting in a smallest confidence level $L_A$.

In addition or alternatively to step 14a, a contrast parameter V can be obtained (step 14b) from the image P or a region of interest T therein or a section $S_1$, $S_2$, ..., generally $S_i$, of the region of interest T as will be explained in greater detail with reference to FIG. 4. The contrast parameter V comprises or consists of a contrast value which indicates the difference in luminance and/or colour of objects, e.g. vehicles 12, or regions in the image P, in the regions of interest T or sections $S_i$; the contrast value is generally obtained from a luminance or colour histogram of the image P, the region of interest T or the section $S_i$ by determining a difference between dissimilar quantiles of the histogram; in simplified variants, a single quantile or the difference in luminance and/or colour of neighbouring pixels could constitute or be added to the contrast parameter V. In addition or alternatively thereto, the contrast parameter V may comprise daylight value obtained indirectly or independently from the captured image P, e.g. by a luminance sensor (not shown) integrated in or separate from the camera 3 and detecting daylight or night conditions, or determined by an expert system, e.g. a daylight calendar, which derives said daylight value from geographical location and local time and/or stored measurement data.

When both step 14a and step 14b are provided, step 14b can be executed prior to, together with, or after step 14a.

In a subsequent step 18, a data-compression unit 19 data-compresses the image P depending on one of said confidence levels $L_i$, $L_A$ or said contrast parameter V, or both. For data-compression of the image P, any convenient algorithm known in the art can be applied by the data-compression unit 19, e.g. according to the ISO 15444 standard. Based on this data-compression step 18, the digital record E is generated and, in a final step 20, transmitted to the data center 6 of the road toll system 1 by means of a transmitter 21.

When data-compressing in step 18, the whole image P can be data-compressed at one and the same compression ratio R, as indicated in FIG. 3. On the other hand, the data-compressing step 18 can alternatively be split into two portions, the first of which being executed on said region of interest T in the image P (or said sections $S_i$), and the second of which being executed on at least the remainder of the image P.

The latter variant of data-compressing the image P in two portions shall now be described with reference to FIGS. 4 to 6.

In a step 22 (FIG. 6) which follows the capture of the image P in step 11 (FIGS. 3 and 6), a selecting unit 23 (FIG. 5) connected to the camera 3 of the roadside unit 2 finds at least one region of interest T in the image P. The region of interest T in the image P contains one or more readable characters $C_i$, e.g. on the license plate 15, the dangerous goods safety mark 16 and/or the country of origin label 17 as per the example of FIG. 2; the image P and the region of interest T could additionally or alternatively contain a maximum speed label, an advertising inscription or similar (not shown). Each region of interest T can either comprise only a single inscription, plate or label as shown for vehicle 12 in FIG. 2, or multiple such elements, which are separate from each another and lie in different areas of the region of interest T, as depicted by the license plate 15 and the country of origin label 17 for vehicle 12' or by the dangerous goods safety mark 16 for vehicle 12 in FIG. 2; typically, though not necessarily, the region of interest T will extend to at least a complete such element.

In a following step 24, an OCR unit 25 connected to the selecting unit 23 obtains the one or more characters $C_i$ from the region of interest T by means of OCR. This is shown in detail for the license plate 15 with license plate number 26 "AB-123C" in the example of FIG. 4: Therein, the license plate number 26 is slightly indistinct due to obstructions in the line-of-sight or the license plate 15 itself being soiled or stained, which influences the accuracy of OCR.

In said step 24, the OCR unit 25 both obtains the characters $C_i$ from the license plate number 26 and a confidence level $L_i$ for each character $C_i$. Each confidence level $L_i$, which may, e.g., be given as a percentage, may depend on the quality of the recognition of the respective character $C_i$ and/or on the character's uniqueness. In the example of FIG. 4, the confidence level $L_2$ of the second character $C_2$ "B" is lower (here: 68%) than the one of the first character $C_1$ "A" (here: 79%) because the letter "B" is similar to the numeral "8"; the third character $C_3$, which in fact is the sign "–", is mistaken by the OCR unit 25 as the sign "=" and obtained at a low confidence level $L_3$ (here: 37%) due to some indistinctness in the image P as well as the similarity of the two signs.

It shall be understood that the selecting unit 23 can be integrated into the OCR unit 25, in which case steps 22 and 24 can be executed in a single step (not shown), or that the region of interest T can even be found in consequence of obtaining the characters $C_i$ by means of OCR.

A next step 27 is executed in a calculation unit 28 connected to the OCR unit 25; in said step 27, a first compression ratio $R_{1,1}$, $R_{1,2}$, . . . , generally $R_{1,i}$, is calculated for each of the one or more sections $S_i$ in said region of interest T. The first compression ratio $R_{1,i}$ depends on at least the confidence level $L_i$ of the character $C_i$ contained in the respective section $S_i$.

Figure 4:
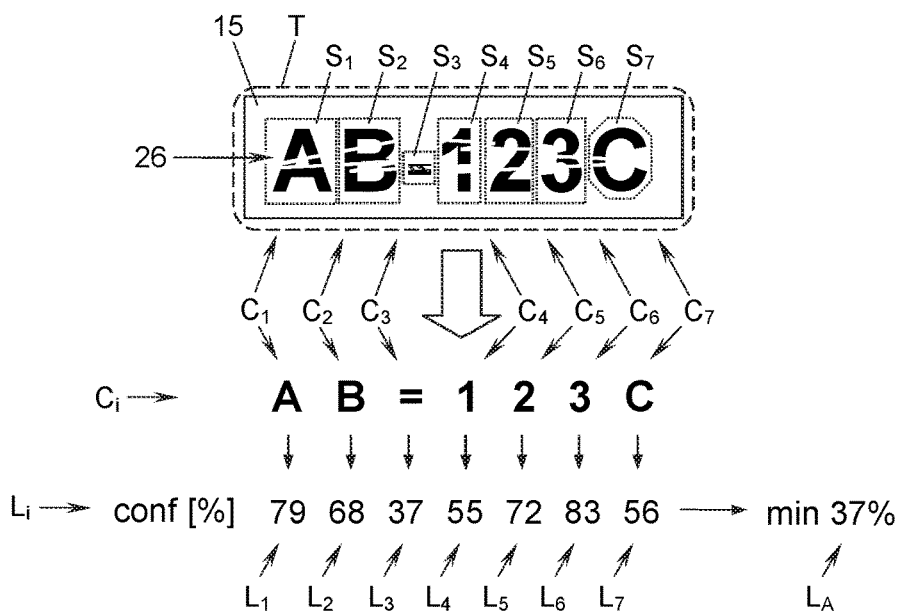
FIG. 4 shows an exemplary license plate of the vehicle in the image of FIG. 2 and characters thereon, with respective confidence levels obtained therefrom by means of OCR in different phases of the method of the disclosed subject matter.

Each section $S_i$ can be defined as a small portion of the region of interest T containing a character $C_i$ with no or barely any surroundings thereof, in which case all sections $S_i$ in the one region of interest T still do not add up to the complete region of interest T, as shown in the example of FIG. 4; in contrast to the example of FIG. 4, neighbouring sections $S_i$ could also overlap partially. Moreover, the region of interest T could be segmented into the sections $S_i$ (not shown), whereat all sections $S_i$ add up to the complete region of interest T. In the case that the region of interest T contains only a single character $C_i$, the only section $S_i$ could be smaller or equal to such a region of interest T. For the definition of the sections $S_i$ an extraction unit 29 can be included as an option, as symbolized by the broken lines in FIG. 5.

Figure 6:
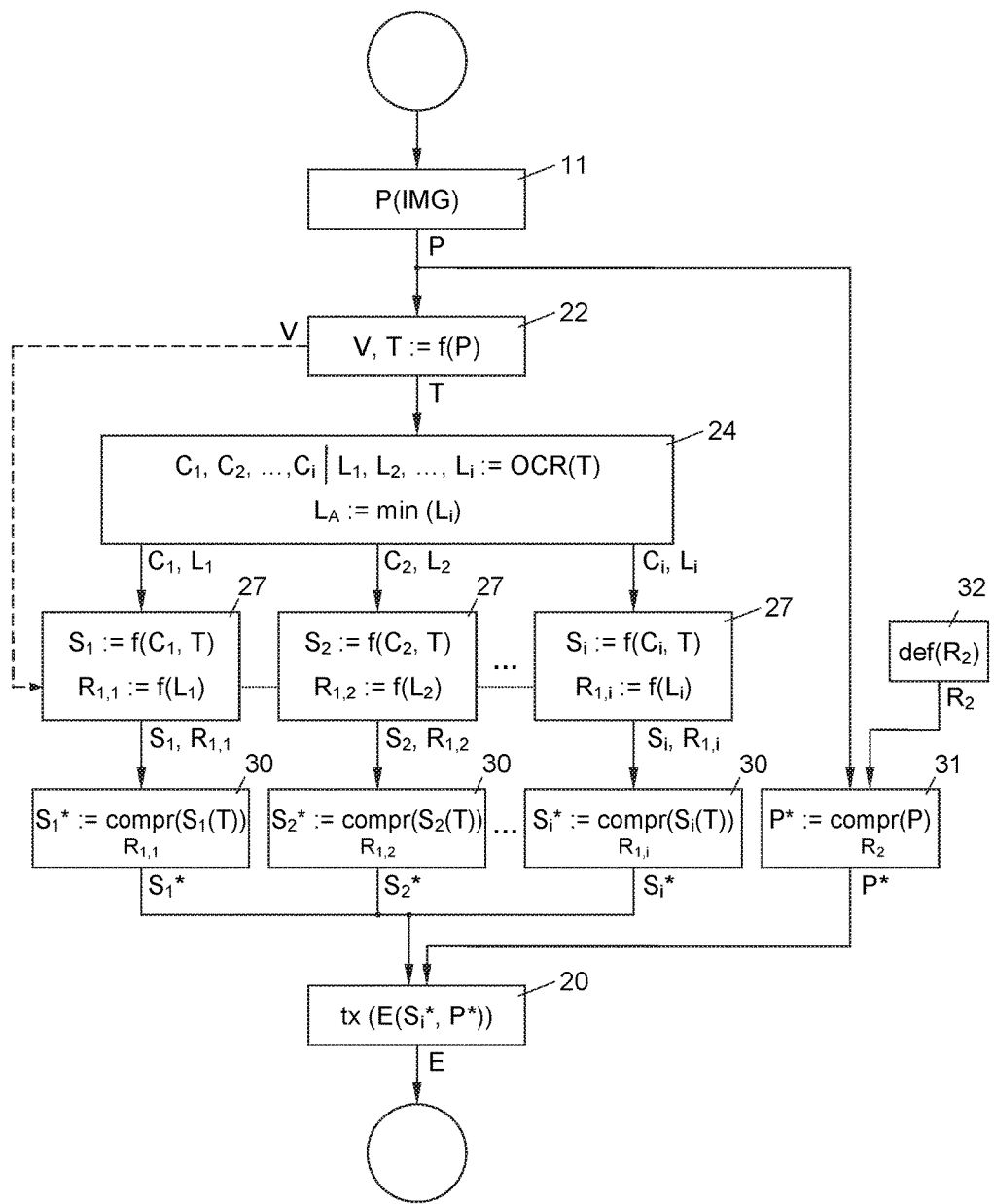
FIG. 6 shows a specific embodiment of the method of FIG. 3 in a flow chart.

If desired, the first compression ratio $R_{1,i}$ for at least one of the sections $S_i$ can be determined also depending on at least the confidence level $L_{i+1}$ of a character $C_{i+1}$ contained in another section $S_{i+1}$, which can be a neighbouring section $S_{i+1}$ or a separate, even remote section $S_{i+1}$, as symbolized by the dotted lines between the steps 27 in FIG. 6. When the region of interest T contains two or more elements, like the license plate 15, the dangerous goods safety mark 16, the country of origin label 17 etc., which in the image P appear in different areas, the sections $S_i$, $S_{i+1}$ for determining said first compression ratio $R_{1,i}$ can even be from different such areas.

When attuning sections $S_i$, $S_{i+1}$ in such a way, the first compression ratio $R_{1,i}$ may also depend on the confidence levels $L_i$ of all characters $C_i$ in the region of interest T, as symbolized by the smallest confidence level $L_A$ of the confidence levels $L_i$, which in the example of FIG. 4 equals 37%. Instead of using the smallest confidence level $L_A$, the first compression ratio $R_{1,i}$ may depend on an average, weighed average, sum or product of two or more confidence levels $L_i$.

Figure 5:
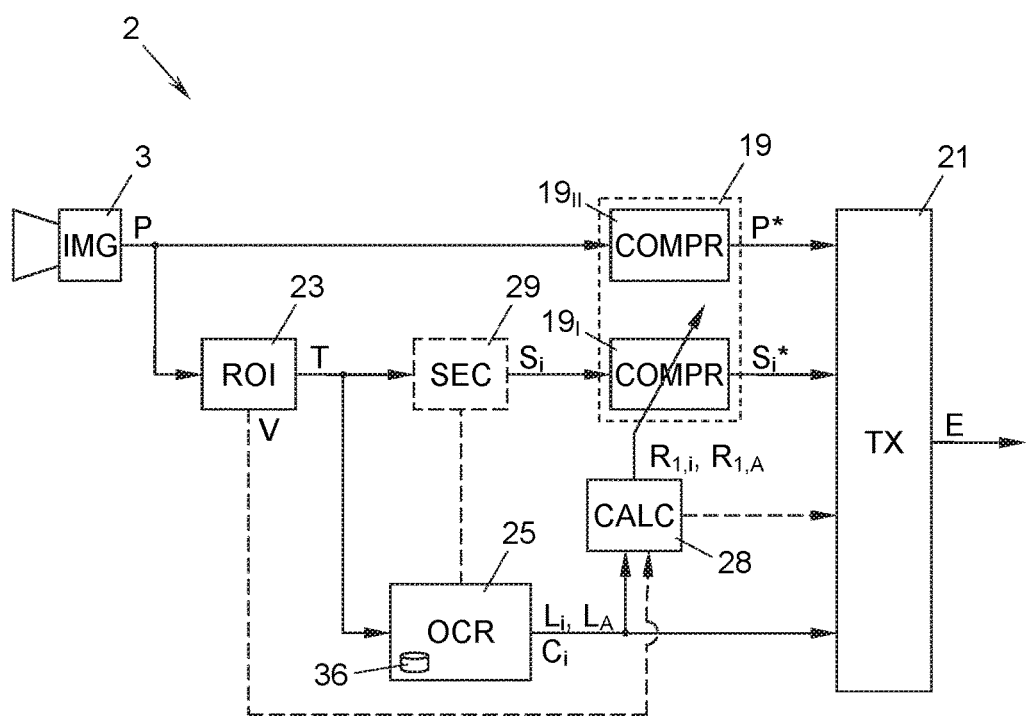
FIG. 5 shows one of the roadside units of FIG. 1 in a schematic block diagram.

Additionally or alternatively thereto, the first compression ratio $R_{1,i}$ for each section $S_i$, can be determined also depending on the contrast parameter V of the image P, the region of interest T, as symbolized by the broken arrow from step 22 to step 27 in FIG. 6, or the respective section $S_i$, in which cases the calculation unit 28 is also connected to the selecting unit 23 which generates the contrast parameter V (see broken arrow in FIG. 5).

In a subsequent step 30 which represents said first portion of step 18 of FIG. 3, the data-compression unit 19, which, in the example of FIG. 5, is connected to the calculation unit 28, the selecting unit 23 (or the optional extraction unit 29) and the camera 3, data-compresses the one or more sections $S_i$, each at its first compression ratio $R_{1,i}$, and thereby generates generally section $S_i$ by section $S_i$ one or more compressed sections $S_i^*$.

Prior to, together with, or after step 30, the data-compression unit 19 also data-compresses at least the remainder of the image P, i.e. the image P without the one or more sections $S_i$, at a predetermined second compression ratio $R_2$ to obtain a compressed image P* in a step 31 representing said second portion of step 18 of FIG. 3. The second compression ratio $R_2$ is defined in a preceding step 32 and can be, e.g., 2:1, 5:1, 10:1, 100:1 etc. to obtain a suitably high data-compression. Step 32 can be executed, e.g., during the installation of the roadside unit 2, so that the second compression ratio $R_2$ is predetermined and invariable, or the second compression ratio $R_2$ could be predetermined repeatedly prior to the step 31, e.g., depending on the contrast parameter V.

In another embodiment, instead of data-compressing just the remainder of the image P in step 31, the complete image P can be data-compressed in step 31 to obtain the compressed image P*.

As per the example of FIG. 5, the data-compression unit 19 can be logically or physically divided into two sub-units $19_I$, $19_{II}$, one of which (sub-unit $19_I$) executes the data-compression step 30 for the segments $S_i$ and the other one (sub-unit $19_{II}$) executes the data-compression step 31 for the image P.

In the embodiments where first and second compression ratios $R_{1,i}$, $R_2$ are applied, each first compression ratio $R_{1,i}$ is lower than the second compression ratio $R_2$; it is even possible that the first compression ratio $R_{1,i}$ of at least one section $S_i$ equals 1:1, so that the respective section $S_i$ is not compressed at all.

In final step 20, the transmitter 21 connected to the data compression unit 19 sends the compressed image P* together with the one or more compressed sections $S_i^*$ as the digital record E via the connection 5 to the data center 6. Therefore, the one or more compressed sections $S_i^*$ can be superimposed to the respective sections of the compressed image P*, or the compressed sections $S_i^*$ are attached to the compressed image P* remaining unchanged.

In any one of the embodiments described above, the digital record E may further comprise the characters $C_i$ obtained by OCR in step 24 and/or the confidence level $L_i$ for each character $C_i$ and/or the smallest confidence level $L_A$, in which cases the transmitter 21 is also connected to the OCR unit 25 and/or the calculation unit 28. The digital record E may further comprise the first compression ratio $R_{1,i}$ for each section $S_i$.

The data center 6 stores the digital records E received from the transmitter 21 via the connection 5 in a connected storage 33 for immediate processing or later reference. In general, the data center 6 creates a character string 34 for identification of a received digital record E, e.g. by attaching the received characters $C_i$ obtained by OCR in the camera unit 2, or by applying its own OCR function on the digital record E or the compressed segments $S_i^*$ therein, and stores the digital record E under this character string 34 as a data record 35 in the storage 33.

In a specific embodiment of the step 24, the OCR unit 25 has a rule base 36 for supporting the OCR by comparing semantics, syntax and/or other features of, e.g. a license plate 15, like its colour, shape, composition etc. Thereby, mistakes like the one made when obtaining character $C_3$ can be corrected during the OCR step 24, e.g. because regular license plate numbers 26 would not contain the sign "=", in which case the sign "=" can be corrected to "−" and the confidence level $L_3$ increased.

Conclusion

The disclosed subject matter is not limited to the specific embodiments described in detail above but encompasses all variants, modifications and combinations thereof which fall into the scope of the appended claims. For example, the selecting unit 23, OCR unit 25, calculation unit 28, extraction unit 29, data-compression unit 19 and transmitter 21 can be physically separate as shown in FIG. 5 or be at least partly integrated into each other and/or implemented as software modules of a processor.

What is claimed is:

1. A method for generating a digital record of a vehicle in a road toll system, comprising, in a roadside unit of the road toll system:
    capturing an image of the vehicle on a roadway by means of a camera of the roadside unit;
    data-compressing the image at a compression ratio depending on at least a confidence level obtained from the image for one or more characters therein by means of OCR to generate the digital record; and
    sending the digital record from the roadside unit to a data center of the road toll system.

2. The method according to claim 1, wherein the image is data-compressed depending on the smallest of one or more confidence levels obtained by means of OCR.

3. The method according to claim 1, wherein in the step of data-compressing, the whole image is data-compressed at one and the same compression ratio.

4. The method according to claim 1, further comprising:
    between said steps of capturing and data-compressing, finding, in the image, at least one region of interest containing said one or more characters and obtaining said one or more characters from said region of interest by means of OCR together with a confidence level of the OCR for each character, defining one or more sections in said region of interest, each section containing a character, and calculating a first compression ratio for each section depending at least on the confidence level of the character contained therein;
    in said step of data-compressing, data-compressing the one or more sections, each at its first compression ratio to obtain one or more compressed sections, and data-compressing at least the remainder of the image at a predetermined second compression ratio to obtain a compressed image, wherein each first compression ratio is lower than said second compression ratio; and
    in said step of sending, sending the compressed image together with the one or more compressed sections as the digital record from the roadside unit to the data center.

5. The method according to claim 4, wherein, in the digital record, the compressed image and the one or more compressed sections are merged.

6. The method according to claim 4, wherein the first compression ratio for at least one of the sections is determined also depending on at least the confidence level of a character contained in another section.

7. The method according to claim 4, wherein the region of interest covers, in the image, a license plate of the vehicle and an area which is separate from the license plate and contains one or more characters.

8. The method according to claim 6, wherein the first compression ratio for at least one of the sections of the license plate is determined also depending on at least the confidence level of a character contained in said other area.

9. The method according to claim 4, wherein the first compression ratio for each section is determined also depending on a contrast parameter of the image, of the region of interest, or of the respective section thereof.

10. The method according to claim 4, wherein, in the step of data-compressing, the complete image is data-compressed to obtain the compressed image.

11. The method according to claim 1, wherein the digital record further comprises the characters obtained by OCR.

12. The method according to claim 1, wherein the digital record further comprises the confidence level of at least one character.

13. The method according to claim 4, wherein the digital record further comprises the first compression ratio for each section.

14. A roadside unit for generating a digital record for a vehicle in a road toll system, comprising:
    a roadside camera for capturing an image of the vehicle on a roadway;
    a data-compression unit configured to data-compress the image at a compression ratio depending on at least a confidence level obtained from the image for one or more characters therein by means of OCR to generate the digital record; and
    a transmitter connected to the data-compression unit and configured to send the digital record from the roadside unit to a data center of the road toll system.

15. The roadside unit according to claim 14, further comprising:
    a selecting unit connected to the camera and configured to find, in the image, at least one region of interest containing one or more characters;
    an OCR unit connected to the selecting unit and configured to obtain the one or more characters from the region of interest by means of OCR together with a confidence level of the OCR for each character;
    a calculation unit connected to the OCR unit and configured to calculate a first compression ratio for each of one or more sections in said region of interest depending at least on the confidence level of the character contained in the respective section;
    the data-compression unit being connected to the calculation unit, the selecting unit and the camera and configured to data-compress the one or more sections, each at its first compression ratio, to obtain one or more compressed sections, and to data-compress at least the remainder of the image at a predetermined second compression ratio to obtain a compressed image, wherein each first compression ratio is lower than said second compression ratio; and
    the transmitter being configured to send, as the digital record, the compressed image together with the one or more compressed sections to the data center of the road toll system.

16. The roadside unit according to claim 15, wherein the selecting unit is configured to determine a contrast parameter of the image, the region of interest or a respective section thereof, and that the calculation unit is also connected to the selecting unit and is configured to calculate the first compression ratio for each section also depending on the contrast parameter.

17. The roadside unit according to claim 15, characterized in that the transmitter is also connected to the OCR unit and configured to include the characters obtained by OCR into the digital record for sending.

18. The method according to claim 1, wherein the compression ratio further depends on a contrast parameter obtained from the image or a region of interest therein or a section of the region of interest.

19. The method according to claim 4, wherein the first compression ratio for at least one of the sections is determined also depending on the confidence levels of all characters in the region of interest.

20. The roadside unit according to claim 14, wherein the compression ratio, which the data-compression unit is configured to data-compress the image at, further depends on a contrast parameter obtained from the image or a region of interest therein or a section of the region of interest.

* * * * *